April 23, 1963
A. EDELSTEIN
3,086,434
EXPOSURE CONTROL
Filed May 22, 1961
3 Sheets-Sheet 1
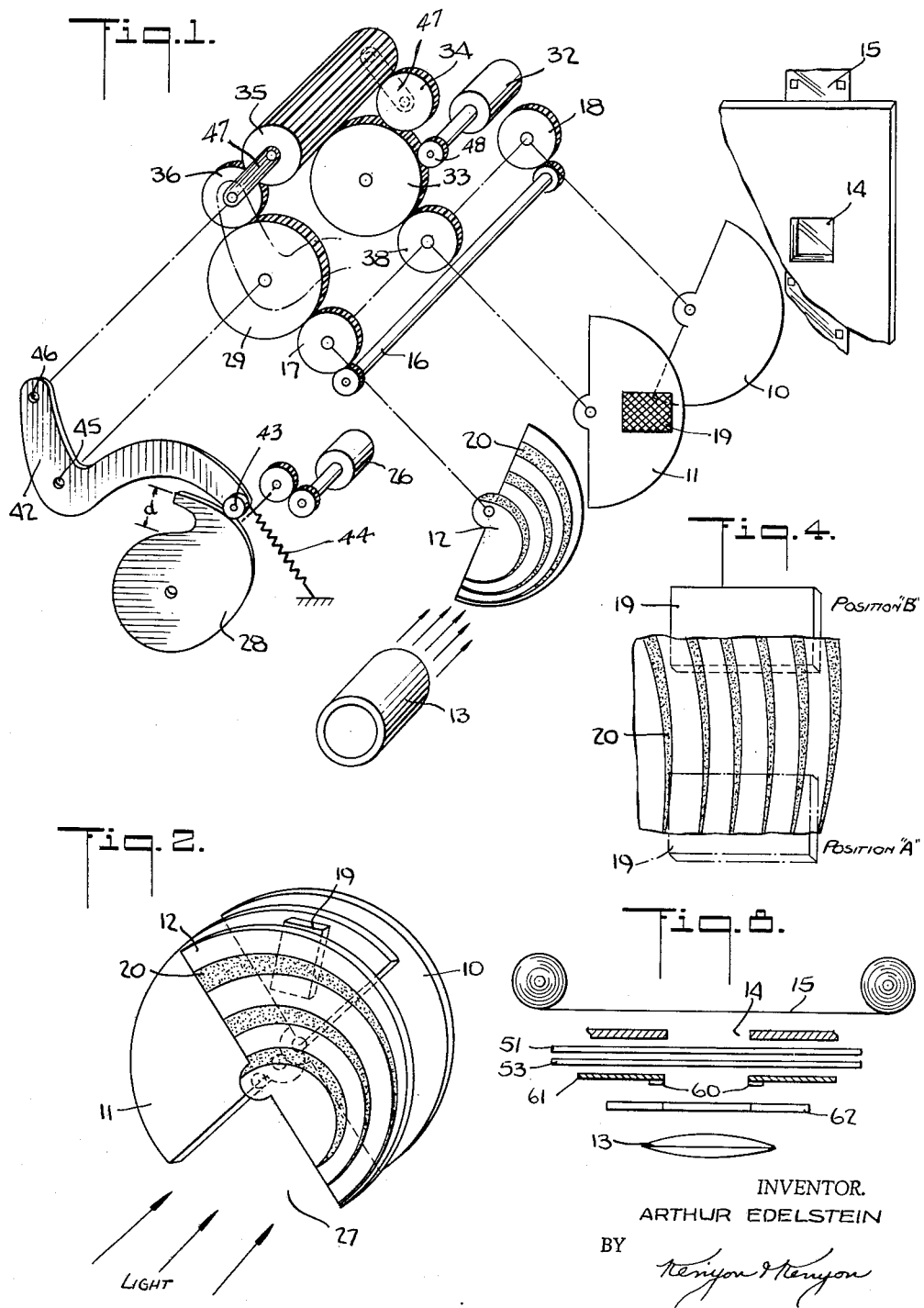
INVENTOR.
ARTHUR EDELSTEIN
BY
Kenyon & Kenyon
ATTORNEYS

INVENTOR.
ARTHUR EDELSTEIN

April 23, 1963 A. EDELSTEIN 3,086,434
EXPOSURE CONTROL
Filed May 22, 1961 3 Sheets-Sheet 3
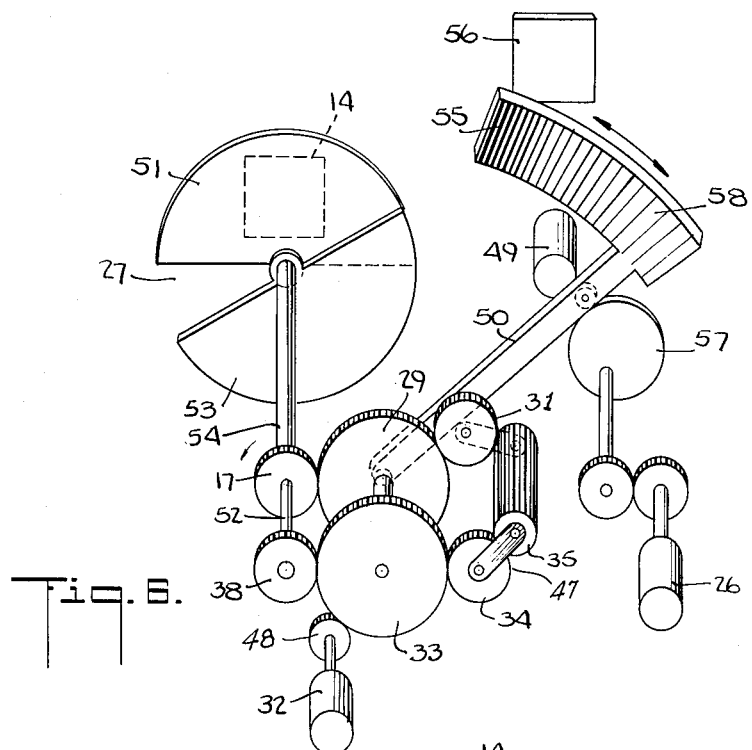
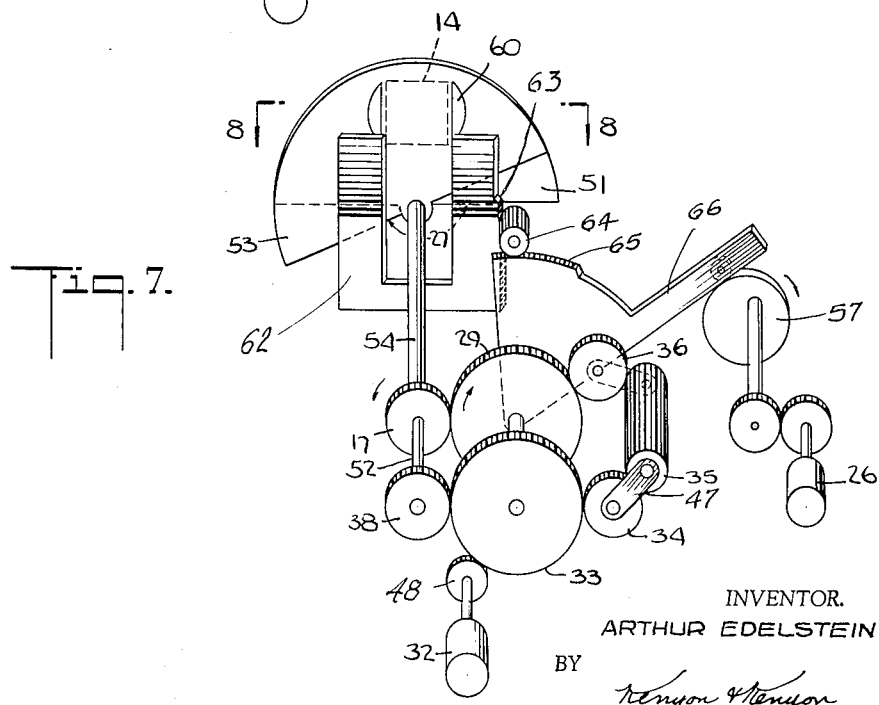
INVENTOR.
ARTHUR EDELSTEIN
BY
Kenyon & Kenyon
ATTORNEYS United States Patent Office 3,086,434
Patented Apr. 23, 1963

3,086,434
EXPOSURE CONTROL
Arthur Edelstein, Jamaica, N.Y., assignor to Bulova Watch Company, Inc., New York, N.Y., a corporation of New York
Filed May 22, 1961, Ser. No. 111,549
6 Claims. (Cl. 95—10)

This invention relates generally to devices for controlling light exposure and more particularly to automatic shutter speed control devices in a camera.

Film exposure is determined, in most cameras, by the combined effect of shutter speed and diaphragm opening. It is known to adjust one or both of these factors as a function of ambient light level or subject brightness so that the film exposure will remain constant or as nearly constant as the adjustment will permit.

A common method of adjusting diaphragm opening or shutter speed is to measure the output of a photoelectric device and to have an adjustment made which is proportional to that output. Most such devices are semi-automatic and require operator action to make the adjustment. This imposes a burden and a distraction on the operator who must pay attention to the photoelectric output measurement and who must also adjust the control as the measurement changes. The semi-automatic arrangement also breeds errors as the operator forgets to watch the indicator because his main attention is directed to the taking of the picture.

Shutter speed adjustments are preferable over diaphragm adjustments because the latter adjustment is tied into a particular lens and thus cameras with adjustable diaphragms cannot use interchangeable lenses. Thus a greater flexibility is achieved by a camera that has a shutter speed adjustment than by one with a diaphragm adjustment.

Accordingly, it is the main object of this invention to provide an apparatus for automatically adjusting the shutter opening to maintain a constant exposure during the taking of a picture regardless of the ambient light conditions or subject brightness.

It is another object of this invention to provide an apparatus for automatically assuring constant light exposure during the taking of a picture while readily permitting lens interchangeability.

Another object of this invention is to provide a method for automatically adjusting shutter speed that can be readily adapted to most types of cameras, including motion picture cameras as well as still photography cameras.

Briefly stated, these and other objects of the invention are accomplished by a shutter mechanism constituted by a series of three blades interposed in the optical path between the lens and the light aperture. In the non-operating condition (that is, between picture taking), ambient light comes through the lens and encounters the first blade in the form of an optical density wedge which is partially opaque and whose opaque portions have a spiral wedge-like design. The light flux, now somewhat reduced in amount by the opaque portions, next impinges on an entirely opaque "fixed" shutter blade. A photoelectric cell is mounted on this "fixed" shutter blade in the path of the light. The photoelectric cell output is fed to a differential reference amplifier which creates a null condition when the cell output represents a specified amount of light flux on the photocell.

An increase or decrease in the light reaching the cell produces a corresponding change in the cell output, thus causing an unbalanced condition in the amplifier and a consequent directional amplifier output. The amplifier output drives a shutter control motor clockwise or counterclockwise, depending upon the direction of the amplifier output. The shutter control motor, through a cam device, imparts a rotational drive to the density wedge blade.

As the density wedge rotates, the amount of light blocked by the opaque wedge-like portions will change, thus changing the photoelectric cell output and restoring the bridge to balance. In this manner, an automatic servo loop is created to rotate the density wedge and maintain the photocell output constant. In addition, the density wedge is ganged to the third blade in the optical path which acts as an adjustable shutter relative to the "fixed" shutter blade. As the density wedge rotates, the adjustable shutter blade rotates, changing its angular relation to the "fixed" shutter blade. The size of shutter opening is determined by the angular relation between the "fixed" and adjustable shutter blades and thus, the size of the shutter opening is determined by the position of the density wedge and ultimately by the intensity of the light falling on the photoelectric cell. In this manner, an automatic servo loop is created to adjust the shutter opening to a value which is appropriate to the ambient light density. When a picture is to be taken, a separate shutter drive motor causes the whole shutter mechanism (all three blades) to rotate 360° as a unit. During that rotation, the shutter opening passes in front of the aperture and the amount of light that passes through the aperture to the film is a function of the size of the shutter opening. Thus the shutter speed is automatically adjusted to ambient light density.

The reference throughout to a fixed shutter blade is with respect to that shutter blade which is not affected by the shutter control motor. It is fixed when shutter speed adjustments are being made but rotates 360° when a picture is being taken.

The above general description is of an embodiment in a still camera. Other embodiments are included in detail in the following description. Further objects and a fuller understanding of the invention may be had by referring to the following description and claims taken in conjunction with the accompanying drawings, in which:

FIG. 1 is a mechanical schematic view of the device of this invention;

FIG. 2 is a perspective view of the shutter arrangement shown in FIG 1;

FIG. 4 is a close-up view of FIG. 2, illustrating two positions of the photoelectric cell behind the density wedge;

FIG. 6 is a mechanical schematic view of an alternate embodiment of the invention;

FIG. 7 is a mechanical schematic view of a third embodiment of the invention; and FIG. 8 is a cross-sectional plan view of FIG. 7 along line 8—8.

Figure 3:
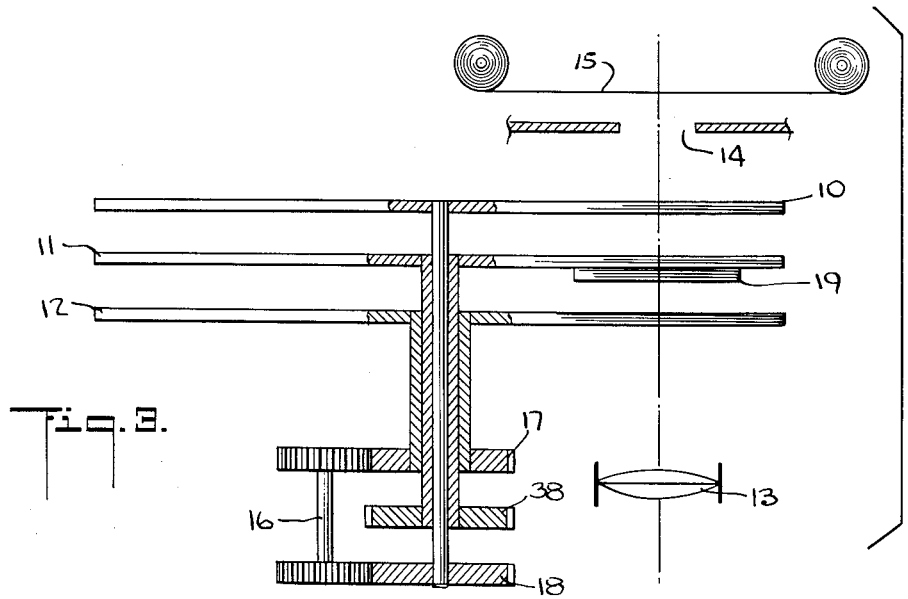
FIG. 3 is a cross-sectional plan view of all elements in the light path.

With reference to FIGS. 1, 2 and 3, there is shown a shutter mechanism comprising three semi-circular shutter blades 10, 11 and 12 mounted coaxially between a lens 13 in a camera and an aperture 14, behind which is disposed a photographic film 15. Shutter blade 10 is adjustable while shutter blade 11 is fixed, whereby the size of shutter opening 27 is determined by angular position of the blades relative to one another. It is to the automatic adjustment of the shutter opening 27 that this invention is addressed.

The third shutter blade 12 is constituted by a density wedge which is kept at the same angular relationship as the adjustable shutter blade 10 by a jack shaft 16. Density wedge 12 and adjustable shutter blade 10 are respectively fixedly mounted on gears 17 and 18, which gears are meshed with the geared ends of jack shaft 16 to maintain a fixed angular relation between density wedge 12 and adjustable shutter blade 10.

A photographic cell or similar photosensitive device 19 is mounted on the fixed shutter blade 11. Density wedge 12 is formed by a transparent body having a series of curved wedge-shaped opaque portions 20, as best seen in FIG. 2. As shown in FIG. 4, the relative angular position between density wedge 12 and the fixed shutter blade 11 will affect the amount of light falling on the photocell 19, because at different positions the wedges 20 will block out a different proportion of the incident light. Thus, at position "A," a greater proportion of the incident light is caused to fall on the cell 19 than at position "B."

Figure 5:
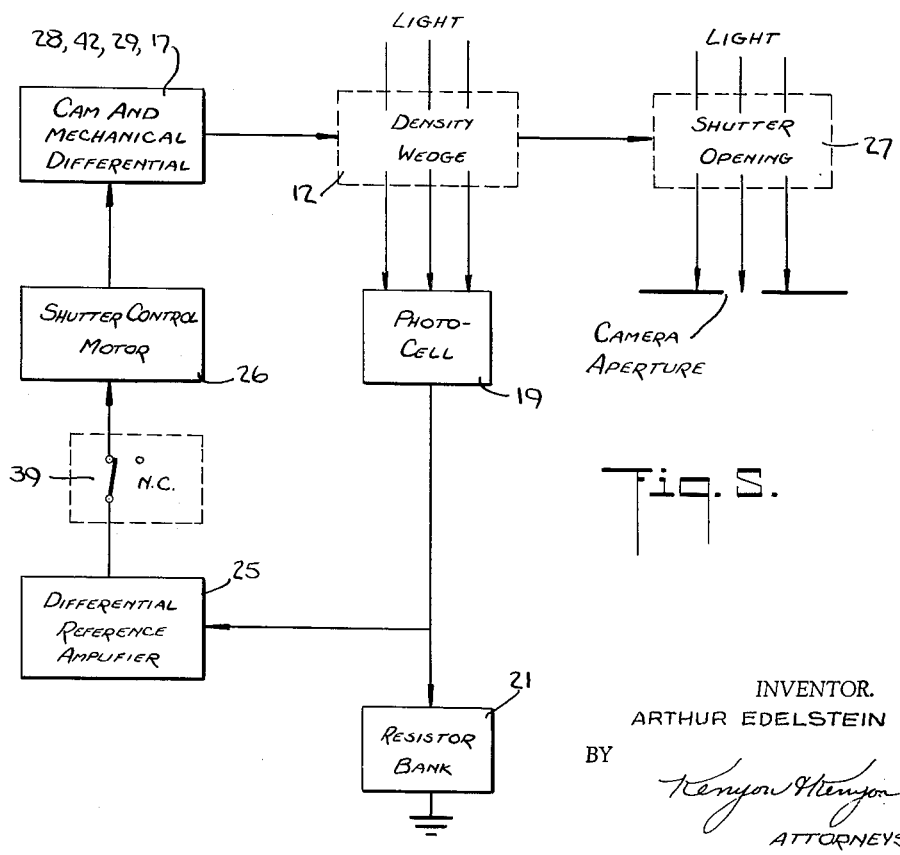
FIG. 5 is a block diagram of the system of which the invention forms a part.

As shown in the block diagram of FIG. 5, the photocell 19 forms one arm of a voltage divider. The other arm is composed of one of the resistors in a bank of resistors 21, the particular resistor selected being dependent upon the film sensitivity. This voltage divider is connected to a differential reference amplifier 25. The circuit of differential reference amplifier 25 is designed to produce a null output only when the output of cell 19 corresponds to that which is caused by a specified amount of light falling thereon. When the light on the cell 19 increases or decreases, its output correspondingly increases or decreases to produce a variation about a norm on the voltage divider input to the amplifier 25. The amplifier 25 will then produce a directional output to drive the shutter control motor 26 either clockwise or counterclockwise, depending on the direction of the amplifier 25 output.

In this preferred embodiment, the fixed resistor arm of the voltage divider is selected from a bank of resistors 21. Each resistor is labelled with an ASA film sensitivity rating and is selected by the operator to correspond with the rating of the film being used. The resistor values may be determined empirically to produce the shutter speed desired for the particular film at any illumination intensity.

The shutter control motor 26 is schematically linked by means of a cam 28 and gear 29 to rotate the density wedge 12. As the density wedge 12 rotates, the amount of light reaching the photocell 19 changes (for example, see the two cell positions illustrated in FIG. 2). Density wedge 12 continues to rotate until the output of the photocell 19 returns to its initial value and so restores the norm on the voltage divider 19, 21 input to the amplifier 25. At such point, the null condition is regained and the motor 26 stops.

Since adjustable shutter blade 10 is operatively ganged to density wedge 12, it also rotates to a new position, causing a change in the shutter opening 27 proportional to the extent of density wedge 12 rotation necessary to maintain the photocell 19 output constant. Thus, as ambient light conditions change the amount of light falling on the photocell 19 changes, causing rotation of the density wedge to maintain the lumen input to the photocell 19 constant. A corresponding rotation of the adjustable shutter blade 10 causes an adjustment in the shutter opening 27 to compensate for the changed ambient light conditions and to maintain the lumen input through the aperture 14 constant.

When a picture is to be taken the shutter drive motor 32 is activated to drive gear 33 and through the gear train 34, 35 and 36 to also drive gear 29. Gears 29 and 33, respectively, drive gears 17 and 38 on which the density wedge 12 and fixed shutter blade 11 are respectively mounted. Through jack shaft 16, the gear 17 concurrently drives the gear 18 on which the adjustable shutter blade 10 is mounted. Thus, all three blades 10, 11 and 12 are concurrently rotated and the shutter opening 27 is caused to traverse the camera aperture 14. A switch (not shown) is used to shut off the shutter drive motor 32 after 360° rotation of the blades 10, 11 and 12. This switch may be operated by a simple cam which is associated with any gear in the camera that rotates once with each shutter rotation. For example, gear 38 could be used for this purpose. The switch must have an override so that the motor 32 can be started when the next picture is to be taken.

To avoid unwanted shutter opening corrections when the cell 19 is out of the light path during camera operation, a cam (not shown) may be placed in the mechanical linkage to open a switch 39 and interrupt the amplifier 25 during all parts of the operating cycle except the beginning and the end.

FIG. 1 is a schematic view and for ease of illustration the jack shaft 16 is shown spanning the fixed shutter blade 11. In such an arrangement the jack shaft 16 would interfere with the 360° rotation of the fixed shutter blade 11. Thus in practice the three shutter blades 10, 11 and 12 are actually arranged to have concentric, separate coaxial shafts as shown in FIG. 3 and the jack shaft 16 is placed at an end of the shafts, on one side of all three blades.

FIG. 1 illustrates the mechanical linkage between the shutter control motor 26 and the density wedge 12. The shutter control motor 26 is geared to the shaft of cam 28. A cam follower 42 is an arm which is caused to oscillate with maximum excursion "d" as the cam 28 rotates. Cam follower 42 rides on cam 28 by means of wheel 43 and is held against cam 28 by spring 44. The cam follower 42 is pivotally mounted at intermediate point 45 on the shaft of gear 29 and is also pivotally mounted at end point 46 on the shaft of gear 36. Thus the cam follower 42 acts as a carrier for gear 36 which gear 36 is otherwise not supported. As the cam follower 42 moves in response to cam 28, gear 29 will rotate to cause gear 17 and thus density wedge 12 and shutter blade 10 to rotate. The following explains why gear 29 rotates as cam follower 42 moves in response to cam 28.

Intermediate point 45 on cam follower 42 is mounted on the shaft of gear 29 and thus intermediate point 45 remains stationary as the cam follower 42 moves in response to cam 28. In other words, cam follower 42 pivots about point 45 because the shaft of gear 29 is stationary. As follower 42 pivots about point 45, the end point 46 must describe an arc relative to point 45. But since the follower 42 is mounted on gear 36 at point 46, the gear 36 must move in an arc about the axis of gear 29.

At the other end of the gear train 29, 36, 35, 24, 33, the shutter drive motor 32 is connected through a gear reduction unit to gear 48, which gear 48 is in mesh with gear 33, so that gear 48 and consequently gear 33 are locked in place when the shutter control motor 32 is not operating. Gear 34 being in mesh with gear 33 and having a fixed shaft is also locked into position and cannot rotate. However, the differential gear 35 is an idler gear carried on gear 34 and 36 by carrier links 47. Thus gear 35 is not locked to gear 34 and can rotate about its own axis as long as such rotational motion can be transmitted through the other gear, that is gear 36, with which the differential gear 35 is in mesh.

Gear 36 both walks around gear 29 and rotates in mesh with gear 29 as gear 36 describes an arc along the circumference of gear 29 under the urging of cam follower 42. Gear 36 walks around gear 29 because it must to readjust to a new cam follower 42 position. To walk around gear 29, gear 36 must rotate about its own axis. In so rotating, it will rotate gear 35 because those two gears are in mesh. Gear 35 in turn will exert rotational force on gear 34. However, gear 34 is locked into position for the reason stated above and thus gear 35 must walk around gear 34 in lieu of rotating in mesh with gear 34. In so doing, gear 35 rotates about its own axis and sends rotational drive back through the gear train 36, 29 and 17 to drive the density wedge 12 through an arc.

The adjustable shutter blade 10 being ganged to the density wedge 12 will also rotate. Thus, the angular relation between the fixed shutter blade 11 and the adjustable shutter blade 10 will change and so affect the shutter speed. Because of the combination of the differential gear 35 with the cam follower 42 connection as a carrier between gears 29 and 36, the same gear train can be used to effect both the shutter opening 27 adjustment and the shutter opening 27 rotation during picture taking.

As may be seen in FIG. 5, the density wedge 12 adjustment to assure constant light flux input to the photocell 19 is all part of a servo loop. However, as also seen in FIG. 5, the shutter adjustment is not part of that loop. There is no direct response to the light flux passing through aperture 14 to assure that such light flux remains constant. The density wedge 12 must be so designed that its movement to maintain constant light flux input to the photocell 19 will also assure constant light flux input to the aperture 14. This tie-in between the density wedge 12 and the shutter opening 27 is attained by design of the thickness and frequency of the opaque portions 20 of the density wedge 12.

The preferred general shape and deployment of the opaque wedges 20 on the density wedge 12 is shown in FIGS. 1 and 4. Other opaque arrangements could be used without departing from the scope of this invention. For example, radial wedges of a thickness or frequency that increases with angular displacement from a blade edge radius could be used. However, in all cases, the exact thickness of frequency of opaque portions 20 must be designed from a test run with a given type of photoelectric cell, as well as a given aperture size and location. It must be remembered that the shutter opening 27 and thus shutter speed will adjust to keep the photoelectric cell 19 output constant. It does not follow that the aperture 14 exposure will remain constant unless the opaque portions of the density wedge 12 are designed to correlate aperture 14 exposure with photoelectric cell 15 output. Such correlation is best obtained by an empirical design of the opaque wedge 20 on any given camera design.

The difference in the number of opaque wedges 20 shown in FIGS. 1 and 4 is merely for clarity in illustration. These are schematic illustrations and the opaque wedges 20 shown are representational only. The exact number will depend on the design requirements above mentioned.

*Auxiliary Lens Embodiment*

The embodiment of the invention thus far described has its greatest applicability in cameras for the taking of still pictures or snapshots. Its limitation in motion picture cameras rests in the fact that the adjustment mechanism must be shut off, achieved through the opening of switch 39, while a picture is being taken in order to avoid unwanted shutter opening 27 corrections while the photocell 19 is out of the light path. FIGS. 6, 7 and 8 illustrate two different embodiments of the invention that are more appropriate for motion picture cameras and particularly for motion picture cameras that are continuously run for long periods of time so that changes in the ambient light conditions are likely during a run of the camera.

FIG. 6 schematically illustrates an arrangement that uses an auxiliary lens 49. The operation and arrangement of gears 17, 29, 36, 35, 34, 33, 38 are identical with their operation and arrangement in the main embodiment described above. Idler gear 36 and differential gear 35 permit rotation of gear 29 in response to the movement of gear 36 under the urging of cam follower 50 without requiring rotation of gear 33; yet permit rotation of gear 33, in response to the shutter drive motor 32, to be transmitted to gear 29.

A fixed shutter blade 51 is fixed to the axial shaft 52 of gear 38. A variable shutter blade 53 is fixed to the axial shaft 54 of gear 17. Shafts 52 and 54 are separate shafts arranged concentrically to permit all gearing to be placed on one side of the shutter arrangement and to allow close spacing of shutter blades 51 and 53.

As in the main embodiment a shutter drive motor 32 is geared to gear 33 to cause simultaneous rotation of both shutter blades 51 and 53. The shutter blade opening 27, also termed shutter speed, is affected by a servo arrangement which in block form is identical with that shown in FIG. 5 for the main embodiment. The major difference, as seen in FIG. 6, is that the density wedge 55 is neither aligned with the shutter blades 51, 53 nor in front of the camera aperture 14 but rather is in-between an auxiliary lens 49 and a photocell 56. In this embodiment, the photocell 56 can be permanently mounted with respect to the camera casing and thus will always be in the light path from auxiliary lens 49. Consequently, there is no need to cut out the shutter control correction during any period when pictures are being taken and the invention can be used in a motion picture camera.

The cam 57 is geared to the shutter control motor 26, which in turn responds to the directional output of the differential reference amplifier 25. The position of the cam 57 affects the position of cam follower 50 to which the density wedge 55 is attached. Thus, as the position of the density wedge 55 changes, the cell 56 output changes until a zero output is obtained from the differential reference amplifier 25. The cam follower 50 also acts as a carrier link for gears 29 and 36. As the cam follower 50 moves, gear 36 walks around gear 29, and for the reasons described under the still camera embodiment above has an additional rotational motion about its own axis, thus causing gear 29 to rotate. This rotation of gear 29 rotates gear 17 and consequently the variable shutter blade 53, thus affecting the shutter blade opening 27 proportionally to the density wedge 55 movement.

The purpose of this whole design is to keep the light input to the aperture 14 constant during the taking of each picture frame by keeping the light input to the photocell 56 constant and tying the device (density wedge 55) for keeping the photocell 56 input constant to the device (shutter opening 27 mechanism) that determines the amount of light input to the aperture 14. To make sure that this tie-in between the density wedge 55 and the shutter opening 27 operates to adjust the shutter opening adequately, the opaque portions of the density wedge 55 must be designed for width and frequency variations that are adapted to the dimensions of a particular camera.

In FIG. 6, a condition of near maximum light intensity is shown. As light intensity decreases, the directional output of the differential reference amplifier 25 will cause the shutter control motor 26 and thus the cam 57 to rotate counterclockwise. Accordingly, the cam follower 50 and the density wedge 55 will rotate counterclockwise about the axis of gear 29. Because gear 36 is mounted at its axis on cam follower 50, it must travel with cam follower 50 and thus move in a counterclockwise arc. However, since gear 36 is in mesh with gear 29, gear 29 will rotate clockwise about its own axis, to produce a counterclockwise rotation of the adjustable shutter blade 53. Thus, the shutter blade opening 27 will increase in response to decreased light. The aperture 14 is shown in dotted lines behind the fixed shutter blade 51 where it will remain shunt off from light until the shutter drive motor 32 causes both shutter blades 51, 53 to rotate 360°.

*Split Photocell Embodiment*

The advantage of the auxiliary lens embodiment just described rests in the fact that the shutter opening 27 control can operate while pictures are being taken and thus makes the invention practical for all types of motion picture cameras. One disadvantage is in the requirement for an additional lens 49 and the fact that the light cone impinging on the photocell 56 is different from the light cone impinging on the aperture 14. A third embodiment overcomes these relatively minor disadvantages at the price of a third disadvantage, some loss in sensitivity.

FIGS. 7 and 8 illustrate a third embodiment, adaptable to motion picture cameras yet not requiring an auxiliary lens. The main distinctive element in this third embodiment is the split photocell 60 deployed to the side of the aperture 14.

The gear train mechanism 17, 29, 36, 35, 34, 33, 38, as well as the shutter shaft 52, 54 and shutter 51, 53 arrangement is the same as that described for the other embodiments. To avoid the auxiliary lens 49 and yet permit shutter opening 27 adjustment during picture taking, it is necessary to mount the photocell 60 permanently in the light cone. When so mounted, the photocell 60 must not interfere with the light impinging on the aperture 14. These limitations are met by mounting the photocell 60 in the periphery of the light cone, away from in front of aperture 14. A smaller photocell 60 is needed than can be used in the other embodiments described above because the center area of the light cone cannot be used. The smaller photocell 60 reduces sensitivity. To keep sensitivity as high as this design will permit, two photocells 60 are used, one on each side of the aperture 14.

The two photocells 60 are mounted on a fixed support 61 between the shutter blades 51, 53 and the lens 13, with the photocells facing the lens 13. Between the lens 13 and the cells 60 is a U-shaped density wedge 62 having a rack portion 63 on one of its outer sides. A pinion 64 in mesh with rack 63 and sector gear 65 translates rotational motion of cam follower 66 into vertical motion of density wedge 62. Since cam follower 66 is also a carrier link between gears 29 and 36, it operates in the same fashion as do cam followers 42 and 50 in the above described embodiments to cause rotational motion of gear 29 in response to cam follower 66 movement. Consequently movement of cam follower 66 causes rotation of adjustable shutter blade 53 and thus change in the shutter blade opening 27.

FIG. 7 illustrates the density wedge 62 at a position corresponding to rear minimum ambient light conditions. As light intensity increases, the output of photocells 60 will increase causing a directional output in the differential reference amplifier 25 and clockwise rotation of shutter control motor 26 and cam 57. As cam 57 rotates, clockwise, cam follower 66 will rotate counterclockwise about the axis of gear 29, causing the density wedge 62 to move up and the shutter blade opening 27 to decrease as adjustable shutter blade 53 rotates counterclockwise. As in all the embodiments, a proper correlation between density wedge 62 movement and shutter opening 27 change depends on designing the width and frequency of the opaque portions 67 of the density wedge 62 to the physical parameters of the rest of the camera and shutter control mechanism.

As the various embodiments illustrate, there is a wide range of structural variation that may constitute a setting for the basic invention. The basic invention is the combination of a servo loop (see FIG. 5), having a density wedge closing the loop, and a shutter control operating off that same density wedge. Within this inventive concept, numerous embodiments may be made and it is to be understood that the particularity of the description is by way of example.

One aspect of this particularity is the density wedge described and illustrated in each embodiment. The density wedge is an important element of the invention but it is not intended to restrict the claims to embodiments employing a particular shape or design of density wedge. Therefore, the term density wedge in the claims shall be understood to mean any light filter or shading device to partially obstruct incident light where the fraction of light obstructed varies with the area of the density wedge on which the light falls. Many changes and adaptations will be apparent to one skilled in the art and can be made without departing from the scope and claims of the invention. It is intended, therefore, to cover all such modifications as fall within the true scope of the invention.

I claim:
1. In a camera having a lens and camera aperture, a shutter control mechanism comprising an adjustable shutter blade, a density wedge coaxial with said adjustable shutter blade, means to maintain a constant angular relation between said adjustable shutter blade and said density wedge, a fixed shutter blade coaxial with and located between said density wedge and said adjustable shutter blade, a light responsive transducer mounted on said fixed shutter blade and facing said density wedge to provide a control signal, said adjustable shutter blade, said fixed shutter blade and said density wedge being deployed between said lens and said camera aperture with said density wedge being closest to said lens, and means responsive to variations in said control signal and operatively coupled to said density wedge to vary the angular position of said density wedge and the adjustable shutter blade in a direction and to an extent tending to maintain said control signal constant whereby the resultant angular displacement between said fixed and adjustable shutter blades constitutes a shutter opening, and means to rotate said shutter control mechanism as a unit relative to said camera aperture to provide an exposure in accordance with said shutter opening.

2. A camera shutter control mechanism comprising an adjustable shutter blade, a density wedge coaxial with said adjustable shutter blade, means to maintain a constant angular relation between said adjustable shutter blade and said density wedge, a fixed shutter blade coaxial with and located between said density wedge and said adjustable shutter blade, a light responsive transducer mounted on said fixed shutter blade and facing said density wedge to provide a control signal, electrical means responsive to variations in said control signal to produce an indicating signal, and means responsive to said indicating signal and operatively coupled to said density wedge to vary the angular position of said density wedge and the adjustable shutter blade in a direction and to an extent tending to maintain said control signal constant whereby the resultant angular displacement between said fixed and adjustable shutter blades constitutes a shutter opening, and means to rotate said shutter control mechanism as a unit relative to the camera aperture to provide an exposure in accordance with said shutter opening.

3. A camera shutter control mechanism comprising a fixed shutter blade, a pivotally mounted adjustable shutter blade coaxial with and on one side of said fixed shutter blade, a pivotally mounted density wedge coaxial with and on the other side of said fixed shutter blade, means to maintain a constant angular relation between said adjustable shutter blade and said density wedge, a light responsive transducer mounted on the surface of said fixed shutter blade facing said density wedge in the path of light incident to the camera to provide a control signal, electrical means responsive to variation in said control signal to produce an indicating signal, and servo control means responsive to said indicating signal and operatively coupled to said density wedge to pivot said density wedge and said adjustable shutter blade in a direction and to an extent tending to maintain said indicating signal at a zero value thereby forming a shutter opening between the adjustable and fixed blades.

4. In a camera shutter control mechanism, as set forth in claim 3, wherein said density wedge comprises a transparent body and a series of opaque parallel spiral segments within said body, each spiral segment having an evenly variable width progressing from its minimum width at one end of said spiral segment to its maximum width at the other end.

5. A camera shutter control mechanism comprising a fixed shutter blade, an adjustable shutter blade located coaxially with said fixed shutter blade, a density wedge, means operatively coupling said density wedge and said adjustable shutter blade for rotating said adjustable shutter blade to an angular position that is a function of the angular position of said density wedge, a light sensitive transducer mounted on said fixed shutter blade in the path of incident light to provide a control signal, said density wedge being interposed between said transducer and said incident light, and servo control means responsive to said control signal and operatively coupled to said density wedge to pivot said density wedge and said adjustable shutter blade in a direction and to an extent tending to maintain the output of said transducer constant.

6. The invention of claim 5 wherein said servo control means includes a cam arrangement to limit said pivoting of said density wedge to an oscillatory track.

References Cited in the file of this patent

UNITED STATES PATENTS

| | | |
|---|---|---|
| 2,247,323 | Tonnies | June 24, 1941 |
| 2,279,723 | Tonnies | Apr. 14, 1942 |
| 2,285,761 | Tonnies | June 9, 1942 |
| 2,477,235 | Broido | July 26, 1949 |
| 2,521,093 | Rath | Sept. 5, 1950 |
| 2,655,848 | Gray | Oct. 20, 1953 |
| 2,683,402 | Bruck | July 13, 1954 |
| 2,858,750 | Farinet | Nov. 4, 1958 |